May 2, 1950  W. L. MORRISON, JR  2,506,465
ANCHORING PIECE FOR HANDLES FOR THE
SIDES OF COOKING UTENSILS
Filed Jan. 10, 1947

INVENTOR.
WILLARD L. MORRISON JR.
BY John W. Michael
ATTORNEY.

UNITED STATES PATENT OFFICE 2,506,465

ANCHORING PIECE FOR HANDLES FOR THE SIDES OF COOKING UTENSILS

Willard L. Morrison, Jr., West Bend, Wis., assignor to West Bend Aluminum Co., West Bend, Wis., a corporation of Wisconsin Application January 10, 1947, Serial No. 721,377

1 Claim. (Cl. 16—124)

This invention relates to improvements in anchoring pieces for handles for the sides of utensils.

It is conventional to make handles for the sides of utensils of non-metallic heat-resistant material to obtain desired appearance and protection from burns. However, it is the practice to secure such handles by means of bolts or rivets, the heads of which are clearly visible when the utensil is viewed in normal use.

It is an object of this invention, therefore, to provide an anchoring piece for a non-metallic handle for the side of a utensil which is invisible when the utensil is normally viewed and which is easily and readily attached to the utensil.

This object is obtained by making the handle long enough to permit the openings for the attaching screws to be placed on each side of the finger-gripping portion and by sloping the axes of such openings with respect to the utensil engaging portion of the handle and the side of the utensil. The openings start below the widest portion or mold line of the handle and slope upwardly and inwardly toward the side of the utensil. This keeps such openings invisible when the utensil is viewed from the normal position and permits the openings to have counterbores of considerable depth which also further hides the screw heads from view. The utensil is provided with attaching means, in the form of an anchoring piece, spot welded or riveted to the side of the utensil, which is provided with threaded openings the axes of which are in alinement with the openings for the screws. The handle has a recess into which the piece fits to permit the inner side of the handle to rest against the side of the utensil.

The novel features, which are considered characteristic of the invention, are set forth with particularity in the appended claim. The invention itself, however, both as to its organization and its method of operation, together with additional objects and advantages thereof, will best be understood from the following description of a specific embodiment when read in connection with the accompanying drawing, in which:

Figure 1:
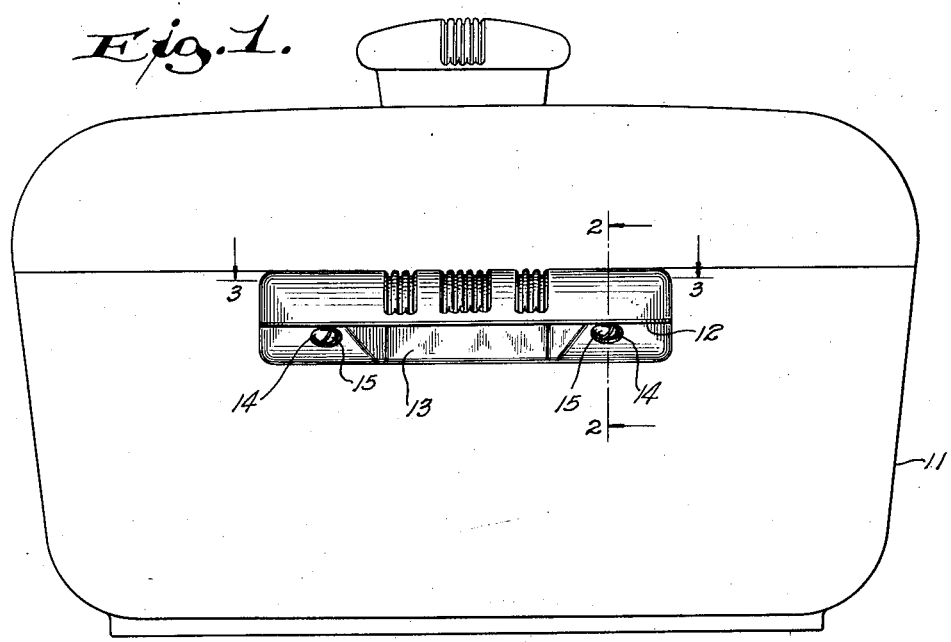
Fig. 1 is a view in side elevation of a handle embodying the invention.
Figure 2:
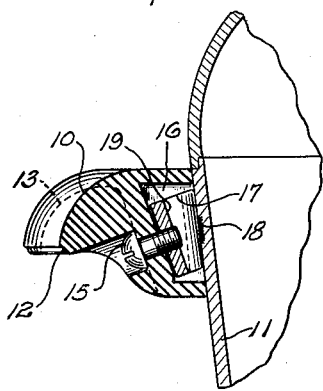
Fig. 2 is an enlarged sectional view taken on the line 2—2 of Fig. 1.

Referring to the drawing by reference numerals the handle 10 is shown mounted to the side 11 of a utensil commonly known as a Dutch oven. In this embodiment the utensil is made of cast aluminum and the handle 10 is molded from heat-resistant black Bakelite. However, other heat-resistant materials or plastics having substantially the same characteristics of heat resistance and strength as Bakelite may be used. A recess 13 which forms a finger-gripping portion is provided in the handle 10 intermediate its ends. The opening of the recess 13 lies below the mold line and its upper finger-engaging surface and may slope upwardly into the upper half of the handle. The handle 10 is long enough to provide solid end portions beyond each end of the finger-gripping recess 13 through which openings 14 for the attaching screws 15 are made. The axes of the openings, as is clearly shown in Fig. 2, start below the mold line 12 and slope upwardly and inwardly toward the inner or utensil engaging portion of the handle. The sloping finger-engaging portion of the recess 13 is thus positioned above the axes of the openings 14 which permits the conservation of the material used in making the handle. Each opening 14 has a counterbore to receive the head of the attaching screws. As the surface of the end portions has a general downward and inward slope, the openings 14 and heads of attaching screw heads 15 contained within the counterbores are invisible when the handle is viewed from above (although to the side of) the mold line of the handle, a view which is customary in the normal use of the utensil.

Figure 3:
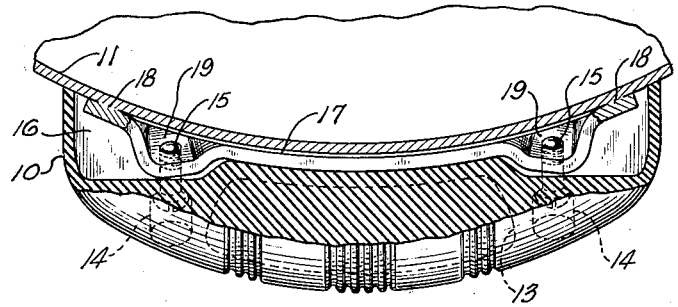
Fig. 3 is an enlarged sectional view taken on the line 3—3 of Fig. 1.
Figure 4:
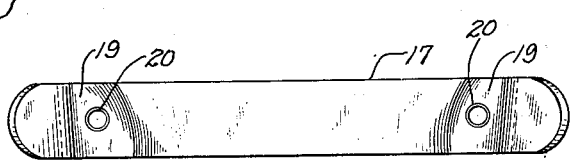
Fig. 4 is a view in side elevation of the inner side of the handle-attaching piece.

The inner face of the handle 10 may be provided with a recess 16 which accommodates the attaching means or anchoring piece 17. The edge of the recess is formed to the same curvature as the side 11 and rests snugly against such side when the handle 10 is drawn in by the anchoring screw 15. The attaching piece 17 (see Fig. 4) may be stamped from aluminum. As shown in Fig. 3, it is curved longitudinally to approximate the curvature of the side 11 and is secured to the side 11 by spot welding its ends thereto, as shown at 18. It is desirable to provide flat portions 19, the surfaces of which slope downwardly and inwardly (see Fig. 2) and are substantially perpendicular to the axes of the screws 15 to more easily enable threaded holes 20, with which the screws 15 engage, to be readily formed therein.

The recess 16 may conform to the shape of the piece 17 and should be deep enough to allow the piece or lug to fully enter within its confines. The handle 10, which is secured to the utensil by the attaching screws 15, may thus be drawn up tightly against the utensil. However, the handle 10 may be easily assembled or disassembled from the utensil by the engagement or disengagement of the attaching screws and yet the appearance of the handle is not spoiled by such screws or the openings in which they are inserted.

Although only one embodiment of the invention is shown and described herein, it will be understood that this application is intended to cover such changes or modifications as come within the spirit of the invention or scope of the following claim:

An anchoring piece for securing to the side of a utensil an elongated handle which has a curved inner face adapted to rest against the side of the vessel for the length of said handle, a finger-gripping portion recessed from the outer side thereof, openings for screws spaced from the ends of said finger-gripping portion, the axes of said openings sloping with respect to the inner face, and an anchoring piece receiving recess in the inner face into which said openings lead; the anchoring piece comprising an elongated longitudinally curved strap of stamped aluminum adapted to lie within the anchoring piece receiving recess of the handle and having end portions adapted to be spotwelded to the side of the utensil, said piece having a flat portion adjacent each end portion and a connecting portion extending between said flat portions, said flat portions being offset from said end portions and said connecting portion and sloped with respect thereto so as to be substantially perpendicular to the axes of the openings in the handle, and a threaded hole in each flat portion adapted to engage screws extending from the openings in the handle.

WILLARD L. MORRISON, JR.

REFERENCES CITED

The following references are of record in the file of this patent:

UNITED STATES PATENTS

| Number | Name | Date |
| --- | --- | --- |
| D. 142,264 | Ramsthal | Aug. 21, 1945 |
| 503,674 | Peacock | Aug. 22, 1893 |
| 2,059,911 | Rebora | Nov. 3, 1936 |
| 2,099,437 | Fischer | Nov. 16, 1937 |
| 2,120,220 | Preston | June 7, 1938 |
| 2,150,247 | Rodwick | Mar. 14, 1939 |
| 2,155,810 | Tinnerman | Apr. 25, 1939 |